June 9, 1953
J. L. BARKER
2,641,707
FREQUENCY RESPONSIVE APPARATUS
Filed Oct. 15, 1948
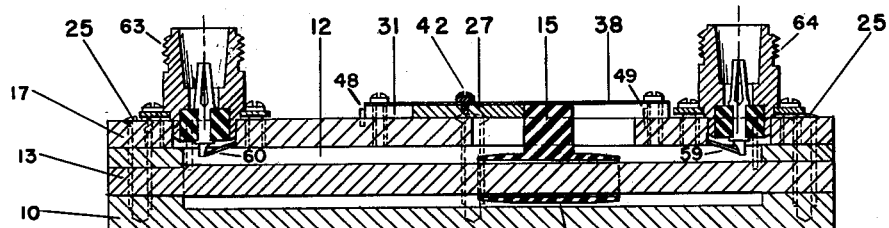
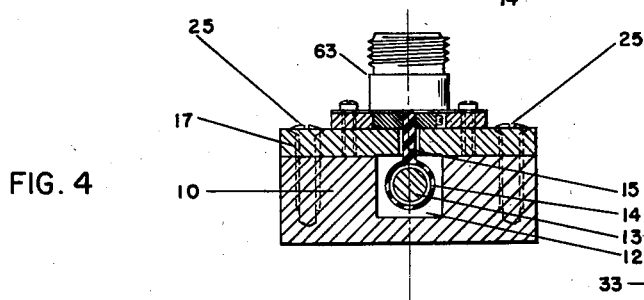
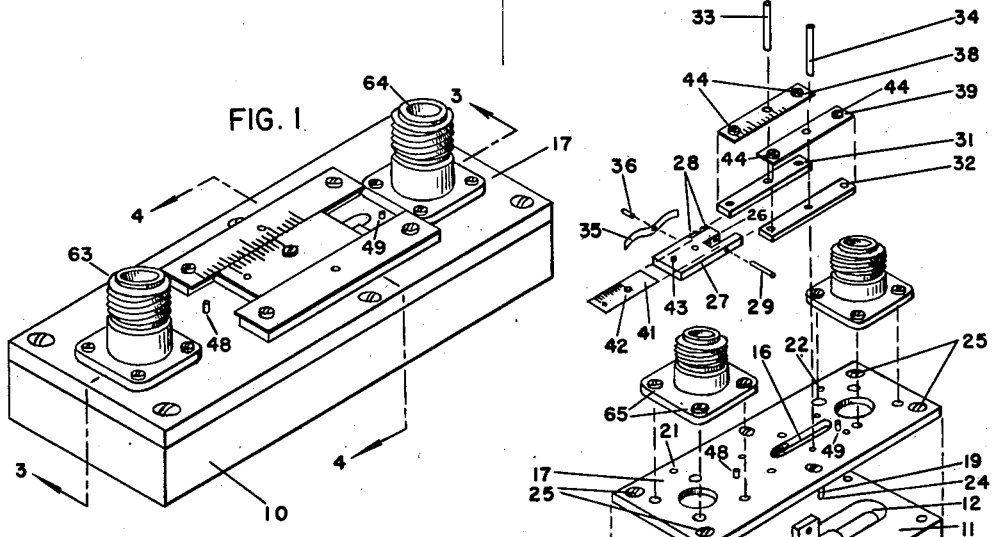
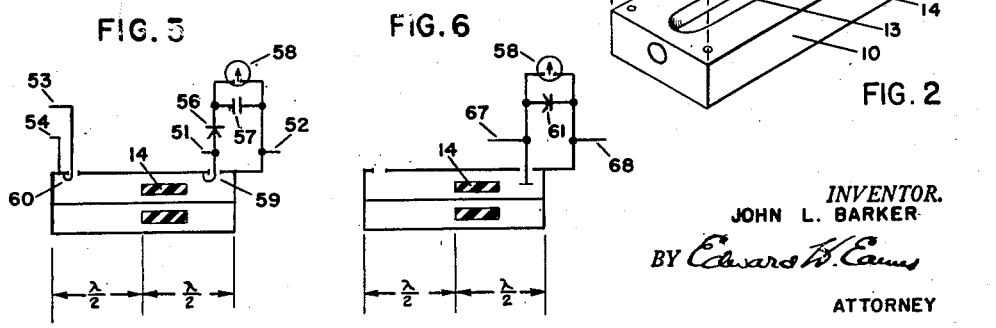
*INVENTOR.*
JOHN L. BARKER
BY Edward W. Eames
ATTORNEY Patented June 9, 1953

2,641,707

UNITED STATES PATENT OFFICE 2,641,707

FREQUENCY RESPONSIVE APPARATUS

John L. Barker, Norwalk, Conn., assignor to Eastern Industries, Incorporated, East Norwalk, Conn., a corporation of Delaware Application October 15, 1948, Serial No. 54,783

11 Claims. (Cl. 250—39)

This invention relates to frequency responsive apparatus and more particularly to apparatus for measuring the frequency or wave length of ultra-high frequency electric oscillations or microwaves.

It is well known in the art that a resonant line or resonant cavity may be employed to indicate the frequency or wave length of such oscillations by varying the length of the circuit until resonance is obtained. The condition of resonance is ordinarily indicated by means of a sensitive meter such as a milliammeter or a microammeter connected to measure the oscillating current in the tuned circuit. The tuned circuit element, with provision for adjustment of its length and a scale on such adjustment calibrated in frequency or wave length, can thus serve as a wave meter.

The wave meter may have the resonance indicating meter connected to the input side of the tuned circuit element, in which case the meter reading is depressed to a minimum when the wave meter is tuned to resonance with the signal being tested; or the indicating meter may be connected to a point in the tuned circuit remote from the point at which the signal being tested is applied and in the latter case the indicating meter will have a peak reading when the wave meter is tuned to resonance.

The present invention provides a novel frequency responsive apparatus, which can serve as a wavemeter element of low loss, high stability, compact size and great simplicity of design, by moving a stable high dielectric material between points of substantially different electric field condition in a cavity or concentric line to tune the cavity or line for resonance with an applied frequency over a relatively narrow range of frequencies, with a cooperating scale indicating the resonant frequency or wave-length for different positions of the dielectric material. The dielectric material may be moved between a point of relatively high electric field (or low magnetic field) and a nearby point of relatively low electric field (or high magnetic field) for example.

Most wave meters for micro-wave frequencies in the prior art using resonant cavities or resonant lines for the tuned circuit are designed for use over a considerable range of frequencies and are consequently quite complex and costly in construction in order to maintain a high degree of accuracy over such range. Such wave meters involve very close tolerances in the manufacture of the various parts and in the mounting and assembly of the working parts, and present considerable difficulty in maintaining accuracy particularly where it is necessary for the moving parts to operate over a considerable range of adjustment for a substantial range of frequencies.

Most transmitters and receivers in the ultra-high frequency or micro-wave range will not ordinarily drift greatly from the approximate frequencies for which they are designed to operate. However, even a relatively small drift or the replacement of one electronic tube with another of the same type for example may cause a shift in operating frequency of a transmitter or receiver or oscillator outside of the narrow range required for proper operation with associated apparatus, or outside the range allocated by regulating authorities for example, and rechecking of the frequency of a signal is required from time to time.

Thus with the more widespread use of transmitter and receiver units in the micro-wave range for example the need has grown for a simple, compact and inexpensive wave meter adapted for testing over a relatively narrow frequency range for use in checking and setting the oscillator frequency within that range.

The present invention provides a compact and greatly simplified frequency responsive device or wave meter to serve this need. The apparatus in one preferred form employs a coaxial line shorted at both ends and of an integral number of half-wave lengths in length for a frequency slightly greater than the highest frequency to be measured, with a sleeve of high dielectric material movable along the center conductor of the line for a short distance to adjust the effective electrical length of the line for resonance over a relatively narrow range of frequency.

The length of the line may be one half wave length or a multiple of half wave lengths, but is preferably a small number of half wave lengths, and the insertion of a material having a dielectric constant greater than air provides a means for varying the effective length of the line by moving the dielectric material along the line. It will be appreciated that the mechanical length of a coaxial line approximates very closely the free space electrical half-wave length of the longest wave to which the line is resonant, providing that the permeability and the dielectric constant are unity for the intervening space between the conductors.

Previous concentric line wave meters have utilized sliding contacts providing a variable location of a short-circuiting connection at one end of the line, which can be used to vary the mechanical length of the line, thus tuning the electrical length of the line. However the use of sliding electrical contacts is likely to limit the Q of the system and to cause erratic operation over a considerabe period of use, and involves manufacturing difficulties.

With the present invention it is possible to provide a rigid construction with solid electrical contact at each end of the coaxial line and to provide a dielectric sleeve which surrounds the central conductor for a short distance and which can be readily moved to vary the effective length of the line with a high degree of accuracy within narrow limits of adjustment.

Thus in accordance with the invention the insertion of polystyrene or other low loss stable material with a dielectric constant higher than unity in the space between the conductors of the coaxial line, and at the proper position along the line as described below, will cause the electrical length of the line to become longer, and thus to resonate at a lower frequency, because of the reduced speed of propagation of an electrical wave in the line. In a resonant line with shorted ends standing waves will have high current points at the two ends, and at any half wave points from them, that is at points with maximum magnetic fields surrounding the center conductor, and such standing waves will have high voltage points between the conductors at the quarter wave length points, that is, at any point of maximum electric field surrounding the center conductor, a quarter wave length from the closed circuit ends or from any intermediate high current point. This dielectric material will produce appreciable shortening of the electrical wave in the line when located at or near the high voltage or high electric field point on the resonant line, and the maximum shortening effect will be at such high voltage point and the minimum shortening effect will be at such high current point. Therefore the dielectric material which is preferably but not necessarily in the form of a sleeve, may be moved along the line between such points to produce a variation in the effective length of the line.

In this connection it is desirable, in order to provide some appreciable breadth of response for convenience in reading the indicating meter approaching the point of resonance, to have the limit of adjustment of the dielectric sleeve near but not directly at the high voltage point in the line, and the range of movement is therefore preferably somewhat less than a quarter wave length between the high voltage point and the nearest high current point.

By using a sleeve approximately or somewhat less than one quarter wave long and which does not completely fill the space between the center and outer conductors, it is possible to secure a very smooth scale of sleeve location against frequency of resonance with a high degree of linearity over a frequency range of about four per cent.

It is therefore an object of this invention to provide an improved frequency responsive apparatus in which the resonant frequency of a cavity resonator is varied by moving a dielectric member between points of different electric field in the resonator.

It is also an object of this invention to provide an improved frequency responsive apparatus in which the effective length of a coaxial line for resonance is adjusted by moving a material of high dielectric constant along such line.

It is another object of the invention to provide an improved frequency responsive apparatus in which the effective length of a coaxial line closed at both ends is adjusted for resonance by means of a high dielectric sleeve surrounding and movable along the central conductor of the line between points of high electric field and high magnetic field in said line.

It is a further object to provide an improved wave meter for ultra-high frequency waves or micro-waves in which the effective length of a coaxial line is varied for resonance by moving a high dielectric material along the line between the conductors of the line.

It is also an object of the invention to provide an improved wave meter of simple, compact and sturdy construction for ultra-high frequency waves or microwaves.

Referring now to the drawings:

Fig. 1 shows a fully assembled frequency responsive unit according to a preferred embodiment of the invention.

Fig. 2 shows an exploded view of the assembly of Fig. 1 to show more clearly the various parts and how they fit together in the assembly.

Fig. 3 shows a cross section view along the center line 3—3, along the long dimension of the unit of Fig. 1.

Fig. 4 shows a cross section transverse to the unit along the line 4—4 of Fig. 1.

Fig. 5 shows a schematic circuit diagram of the unit of Fig. 1 connected to a meter to indicate the position of resonance in the line.

Fig. 6 is an alternate form of circuit in which the unit may be used with a meter to indicate resonance.

Referring now particularly to Figs. 1 and 2 the preferred embodiment of the invention has an essentially rigid base 10 of material having relatively high dimensional stability, and machined accurately to provide the upper surface 11 and the cavity 12 along the long dimension. The base material may preferably be "Invar," but cast iron, aluminum or brass for example will be suitable for most applications.

A rod 13 is rigidly fixed into the base 10 at its two ends so as to extend along the center of the cavity 12. This rod may be knurled at the end or otherwise arranged to have a tight fit for good rigid electrical contact into the base at its ends. Surrounding the rod 13 is a sleeve 14 of high dielectric material such as polystyrene for example, this sleeve 14 having an extension 15 adapted to pass through slot 16 in the cover 17. This cover is also made of a substantial block or plate of metal which may be of material similar to that of base 10 for example, but need not be as thick as the base.

The slot 16 in the cover 17 extends for a short distance substantially along the center line of the cover along the long axis of the assembled unit. The undersurface of this cover is smoothed to match accurately with the upper surface 11 of the base 10 and is held in proper position with respect to the base by means of the dowels 18 and 19, which are best shown in Fig. 2. These dowels and corresponding holes 21 and 22 in the cover and 23, 24 in the base are maintained at close tolerances, and the cover is attached to the base by means of the several screws 25.

The surfaces of the base 10 and rod 13 and of the underside of the cover 17 exposed to the cavity 12, are preferably coated with silver or other precious metal for good surface conduction and resistance to corrosion.

The extension 15 from the sleeve 14 fits into a slot 26 in a plate-like slide 27, and is attached to this slide by means of screws 28 and held in fixed position with respect to the slide by means of the dowel 29, these latter parts being best shown in Fig. 2.

The slide 27 is arranged to move along the cover 17 between the guides 31 and 32, which are rigidly attached to the top of the cover 17 along the sides of the slot 16 and extending some distance beyond the slot and the center of the cover 17. The slot 16 is offset from the center of the cover 17 as will be subsequently explained.

The guides 31 and 32 are maintained accurately in position by means of the dowels 33 and 34 extending into the cover and through the guides. The transverse or shorter dimension of the slide 27 is slightly less than the space between the guides 31 and 32 to provide space for the spring 35 between the upper edge of the slide 27 and the guide 31, this spring being positioned on the slide by means of the pin 36. This spring maintains a mild pressure of the slide against the guide 32 in order to maintain alignment and take up any slight wearing effect, as well as to maintain a slight friction against sliding movement. It wil be obvious that the spring 35 and the pin 36 could alternatively be placed on the opposite edge of the slide 27 with space provided for the spring between the slide 27 and guide 32.

In the preferred construction illustrated the slide 27 is held with just enough clearance for sliding movement on the upper surface of the cover 17 by means of the thin metal plates 38 and 39, one of which, the plate 38 for example, serves as a fixed scale plate, cooperating with the movable scale plate 41 which is attached to the top of the slide by means of the screw 42 and positioned by the dowel pin 43.

The plates 38, 39 are attached to the top surfaces of the guides 31, 32 which in turn are held to the top surface of the plate 17 by means of the screws 44, these plates and guides being properly positioned on the cover 17 by means of the dowels 33, 34, previously mentioned. The stop pins 48 and 49 provide limits for the movement of the slide 27 and the attached sleeve.

The unit has provisions for connection to a source of ultra-high frequency or micro-waves and for an indicating meter. In its preferred and most flexible form both input and output connection facilities, such as connectors 63, 64, are provided as in Figs. 1–5. In this form the input frequency to be measured may be connected at points 53, 54, in Fig. 5, corresponding to connector 63 for example, having a loop 60 at one end of the unit, and the resonance indicating meter circuit, employing a detector element 56 and a capacity element 57 as well as the meter 58, may be connected to the opposite end of the coaxial line unit of the wave meter at 59, corresponding to connector 64 for example. However one of these connections may be omitted if it is desired to use the unit as an input absorption wave meter in which the indicating meter reads at a minimum at the point of resonance. In the latter case the input connections are made at the points 51 and 52 in the schematic circuit of Fig. 5 for example instead of at the points 53 and 54 in this figure, and the meter circuit is also connected to the input leads 51 and 52 and to the coaxial line of the wave meter near one end as indicated at 59.

The detector 56 may be of the coaxial crystal detector type with capacitor 57 associated therewith for example.

The connection 59 is preferably in the form of a loop projecting only slightly below the cover and extending at an angle of about 45 degrees with respect to the long dimension of the cover to provide relatively loose coupling to the coaxial line to avoid tuning the line, and to permit the entry of an appreciable range of frequencies to the unit with a substantially uniform transmission. Where the separate input connection is provided from 53—54 to the coaxial line this connection 60 is of a form similar to connection 59.

In the preferred form of the invention these input and output connections can be in the form of coaxial connectors 63 and 64 attached to the top of the cover 17 by means of the screws 65 and 66 for example, the loops 60 and 59 appearing more fully at the base of connectors 63 and 64 in Fig. 3.

In an alternate form of the invention the capacity coupling shown schematically in Fig. 6 may be employed with the detector element 61 across the meter 58 instead of in series with it and the input connection being made to the indicating meter circuit at the points 67, 68 for the use of the unit as an input absorption wave meter where the indicating meter reads minimum for resonance.

In the preferred form of the apparatus, the sleeve 14, indicated in Figs. 5 and 6, is about or slightly less than one quarter wave length long, with the shorted length of coaxial line being approximately one wave length long, this wave length being that of the highest frequency of the range over which the unit is designed to be operated. The sleeve 14 is shown in Figs. 5 and 6 at the right of the center or half-wave point of the wave meter unit, at about mid-position between the limits of movement of the sleeve, thus corresponding with the offset position of the slot 16 previously pointed out.

The left hand limit of the center of the sleeve is preferably about one-sixteenth wave length to the right of the center half-wave point of the wave meter unit and at this point the maximum frequency scale reading is obtained where a total sleeve movement of one-eighth wave length is employed. As the slide 27 is moved toward the right along the guides, the sleeve 14 moves to the right in Fig. 5 or Fig. 6 for example, and approaches a quarter wave point, and as the center of the sleeve approaches this point the effective length of the concentric line is progressively lengthened and thus the line resonates at a longer wave length or a lower frequency. For a total sleeve movement of about one-eighth wave length a scale approaching a straight line may be obtained. The frequency or wave length values may be indicated on the scale plates, one of which may be arranged as a vernier scale for finer reading, as is well known to those skilled in the art.

It will be noted in Figs. 3 and 4 that the high dielectric sleeve 14 is preferably maintained spaced from the rod 13 constituting the central conductor. This sleeve is maintained in this position by the cooperation of the guides and slide and the upper plate and thus provides a uniform progressive adjustment of the effective wave length for resonance. Since the sleeve is made of polystyrene or like material which is quite stable for conditions of humidity and temperature ordinarily encountered where this instrument would be used, the frequency drift of the unit is almost entirely associated with change in the dielectric constant of the air in the intervening space due to humidity, and such drift is below the value ordinarily required by frequency meters in the micro-wave region.

Other advantages of the unit are that its basic frequency and calibration are fixed essentially by the electrical length of the line which can easily be made as rugged as desired, and that the tuning of the unit is in no way associated with sliding electrical contacts, and that the scale on the unit can be magnified to any desired degree providing a reduction of frequency range in the wave meter can be tolerated. These last two factors are correlated and are determined by the size of the dielectric material of which the sleeve is made.

In considering the effect of a dielectric sleeve in a concentric line and of the size and amount of movement of the sleeve in relation to the frequency range over which the line may be made to resonate to serve as a wavemeter the following points should be noted:

If the sleeve were of negligible size the resonant frequency would be the highest for a given size of line and for a given mode of resonance, and this frequency would be substantially the resonant frequency for an ordinary coaxial line having free space or air between the inner and outer conductors. It will be appreciated that the line may be made to resonate at one mode at a frequency at which the length of the coaxial line approximates one-half wavelength, and that the line will also resonate at higher frequency modes at which the length of the line approximates an integral number of half wave lengths greater than one. For simplicity in this present analysis however, and without intending to limit the invention, only one mode of resonance of the line will be considered, corresponding for example to a wave length equal to the actual length of the line.

If the dielectric sleeve were to fill substantially all of the space between the conductors of the line throughout its length the resonant frequency would be the lowest for this size of line and would be determined by the reduced velocity of propagation of the waves in the dielectric material.

If the dielectric sleeve were approximately one quarter wave length long and were to fill substantially all of the transverse space between the conductors for this quarter wave length along the line, the maximum frequency range for movement of the sleeve would be secured and this frequency range would be substantially less than the total frequency difference between the upper and lower limits mentioned above for the condition of negligible sleeve dimensions and maximum or total space filling sleeve dimensions, respectively.

If the dielectric sleeve is approximately one quarter wave length long a high degree of linearity of displacement of the sleeve versus frequency can be secured, however.

If the dielectric sleeve is approximately one quarter wave length long, the relative proportions of the cross-sectional area occupied by the dielectric material and by the free space transverse to the axis of the line determine the ratio of the frequency change to sleeve movement along the line, and consequently determine the total operating frequency range of the wavemeter. The lower the proportion of the cross-sectional area occupied by the dielectric sleeve the less the frequency change per unit of movement and the less the total frequency range for the total range of movement. Thus by making the sleeve occupy considerably less than the total cross-sectional area between inner and outer conductors a magnification of the scale can be secured, so that a simple directly readable scale can be obtained for a narrow frequency range.

The smaller the diameter of the sleeve is, the less will be the discontinuity introduced in the line by the sleeve, and therefore the less will be the magnitude of any spurious modes of resonance associated with reflection between the sleeve and one end of the line only. Such discontinuity may be kept at a non-interfering value by keeping the sleeve diameter relatively small as indicated in the drawings and by slightly tapering the sleeve to a thinner section at the ends of the sleeve.

For one preferred form of the invention as illustrated and described the sleeve occupies substantially less than one-half of the free space diameter between the conductors and is substantially one-quarter wave length long, and is moved approximately one-eighth wave length about substantially a mid-point between a maximum voltage point and the nearest maximum current point along the line, and a smooth scale is obtained of a range of about one twenty-fifth wave length for an axial sleeve movement of about one-eighth wave length. Thus for a mid-frequency of about 2450 megacycles for example a measurement range from 2400 megacycles to 2500 megacycles can be obtained for a sleeve movement of about one and one-half centimeters or about six-tenths of an inch.

In one practical embodiment of the unit it was found that the frequency reading could be obtained to an accuracy of the order of plus or minus one megacycle over a frequency range of 2400 to 2500 megacycles.

It will be obvious to those skilled in the art that various types of input or output coupling may be employed and that either or both may be of the adjustable type for suitably varying the degree of coupling.

It will also be obvious that various means may be employed for magnifying the scale movement for a given amount of movement of the sleeve, such as through an anti-back lash gear reduction arrangement or other well-known arrangement, if desired.

It will be understood that the dielectric material need not necessarily be in the form of a sleeve although this is the preferred form for uniform and balanced operation.

It will also be appreciated that the dielectric sleeve need not necessarily be spaced from the central conductor but may be of smaller diameter for example to touch the central conductor. However in the preferred form the sleeve is spaced sufficiently for clearance from the central conductor to provide smooth operation and to avoid any mutual wear or binding action between the conductor and the sleeve.

Although a slotted section of coaxial line is illustrated and described as a preferred form of the invention, it will be appreciated that this is only one of several forms of resonators for ultra high frequency or micro-wave energy which may be employed, and that a slotted section of wave guide with a high dielectric element movable between points of different electric field within a quarter wave length of a high-voltage point of standing waves in the guide may serve as an alternate form of the invention, and that such alternate form may be more convenient for the higher end of the micro-wave frequency range.

Thus although one preferred form of the invention has been described and certain variations which may be made in the construction have been pointed out, it will be understood by those skilled in the art that numerous changes may be made in the character or the arrangement of the several parts or in the construction of the frequency responsive apparatus without departing from the spirit of the invention.

I claim:

1. Frequency responsive apparatus for high frequency electrical energy including a substantially rigid metal casing providing a longitudinal internal cavity and a relatively narrow slot communicating with said cavity and extending along a relatively short portion of its length, said casing formed to serve as the outer conductor of a closed concentric line, a conductor centrally disposed in said cavity and electrically connected to said casing at the ends of said cavity to serve as the central conductor of such closed concentric line, a mass having a dielectric constant substantially different from air and principally in the form of a relatively thin-walled elongated sleeve disposed in substantially spaced relation between said central conductor and said outer conductor within said cavity and extending along said central conductor for a relatively small part of the length of the latter, and an adjustable support for said mass with respect to said casing and extending into such slot for so disposing said mass and variably positioning said mass along said central conductor whereby said line may be tuned over a range of frequency.

2. Frequency responsive apparatus as in claim 1 and including connection means attached to said casing for connecting said line to a source of high frequency energy and to an external high-frequency energy responsive device.

3. Frequency responsive apparatus as in claim 1 and including connection means attached to said casing for connection of said line to external high frequency electrical energy means.

4. Frequency responsive apparatus as in claim 1 and including means for connection of high frequency electrical energy to said line and means indicating the amplitude of high frequency electrical energy in said line.

5. A frequency responsive device for high frequency electrical energy including a rigid metal block having a length greater than its width and depth and formed to provide a depressed cavity in one of its longer faces, a rigid metal rod centrally disposed in said cavity along the length of said block and attached at its ends to said block, a rigid metal cover for said one face of said block and formed with a slot therein extending parallel to said rod, said block and rod and cover comprising a concentric line with shorted ends, a high dielectric sleeve around said rod and extending along a relatively short part of the length of said rod, a guide member on said cover and extending parallel to said rod along said slot, a support member attached to said sleeve and extending through said slot in sliding engagement with said guide member to maintain said sleeve in spaced relationship with said block and rod and cover and to move said sleeve over a short range of distance along said rod near a point of maximum voltage for standing waves in said line to tune said line for resonance to such energy over a relatively narrow range of frequency, and a scale associated with said support member and said cover to indicate the frequency for which said line is tuned corresponding to the position of said support member along said range of distance and connection means on said cover for connection of said line to a source of such high frequency energy and to an external high frequency energy indicating device.

6. Frequency responsive apparatus for a relatively narrow frequency range of ultra high frequency energy including a closed concentric line having a length approximating a small integral number of half wave lengths for the highest frequency of such range, a relatively thin-walled elongated sleeve having a di-electric constant substantially greater than air and disposed about the central conductor of said line and having a length along said conductor approximating one-quarter wave length for such frequency, the thickness of said sleeve being relatively small in relation to the radial dimension of the space between the central and outer conductors of said line and being tapered to provide reduced ends, means for moving said sleeve in spaced relation to the conductors of said line along said line between approximately a half wave length mid-position and approximately a quarter wave length position on one side of said mid-position of said line with respect to the center of said sleeve to vary the effective length of said line for resonance between the high and low frequency limits of said range respectively, means associated with said moving means and with said outer conductor to indicate the position of said sleeve along said line and calibrated in terms of the effective wave length of said line for resonance as controlled by said sleeve, and connection means for said line adapted for connection to a source of ultra high frequency energy and to an external ultra high frequency energy responsive device.

7. Frequency responsive apparatus for a relatively narrow frequency range of ultra high frequency energy including a closed concentric line having a length approximating a small integral number of half wave lengths for the highest frequency of such range and having a slot parallel to the axis of the line and through the outer conductor thereof for a part of its length, a high dielectric member having a relatively thin walled elongated sleeve part around the central conductor of said line and of slightly less than one quarter wave length and a spur part extending from said sleeve through said slot to the outside of said outer conductor, guide means extending parallel to and along side said slot along the outside of said outer conductor, and a support plate fixed to said spur part and cooperating with said guide means in sliding engagement therewith to maintain said sleeve part in spaced relation with respect to said central and outer conductors and to move said di-electric member along said line between points of substantially different electric field for standing waves in said line for tuning said line for resonance, cooperating scale means on said guide means and support plate for indicating the position of said sleeve part along said line and calibrated in terms of the effective wave length of said line for resonance as controlled by said di-electric member, and connection means for said line.

8. Frequency responsive apparatus for high frequency electrical energy including a substantially rigid metal casing providing a longitudinal internal cavity and a relatively narrow slot communicating with said cavity and extending along a relatively short portion of its length, said casing formed to serve as the outer conductor of a closed concentric line, a conductor centrally disposed in said cavity and electrically connected to said casing at the ends of said cavity to serve as the central conductor of such closed concentric line, a mass having a dielectric constant substantially different from air and principally in the form of a relatively thin-walled elongated sleeve disposed in substantially spaced relation between said central conductor and said outer conductor within said cavity and extending along said central conductor for a relatively small part of the length of the latter, and an adjustable support for said mass with respect to said casing and extending into such slot for so disposing said mass and variably positioning said mass along said central conductor whereby said line may be tuned over a range of frequency, and means for indicating the position of said mass along said central conductor and calibrated to indicate the frequency for which the line is tuned corresponding to such position.

9. Frequency responsive apparatus for high frequency electrical energy including a substantially rigid metal casing providing a longitudinal internal cavity and a relatively narrow slot communicating with said cavity and extending along a relatively short portion of its length, said casing formed to serve as the outer conductor of a closed concentric line, a conductor centrally disposed in said cavity and electrically connected to said casing at the ends of said cavity to serve as the central conductor of such closed concentric line, a mass having a dielectric constant substantially different from air and principally in the form of a relatively thin-walled elongated sleeve disposed in substantially spaced relation between said central conductor and said outer conductor within said cavity and extending along said central conductor for a relatively small part of the length of the latter, and an adjustable support for said mass with respect to said casing and extending into such slot for so disposing said mass and variably positioning said mass along said central conductor whereby said line may be tuned over a range of frequency, the transverse dimension of said dielectric mass being small in relation to the transverse dimension of the space between said central conductor and said outer conductor whereby a considerable movement of said mass along said conductor is required for relatively small frequency change.

10. A wave meter for high frequency electrical energy including a concentric line of fixed physical length, a high dielectric mass disposed between the central and outer conductors of said line for a small part of the length of said line, means for variably positioning said mass along said line to vary the effective length of said line for such energy, means indicating the position of said mass along said line and calibrated to indicate the frequency corresponding to such effective length for such position, means for connection of such energy to such line, and means for indicating the amplitude of the electrical energy in said line, the transverse dimension of said dielectric mass being small in relation to the transverse dimension of the space between said central conductor and said outer conductor whereby a considerable movement of said mass along said conductor is required for relatively small frequency change.

11. A wave meter for high frequency electrical energy including a concentric line of fixed physical length, a high dielectric mass disposed between the central and outer conductors of said line for a small part of the length of said line, said dielectric mass being in the form of a sleeve approximately one quarter wave length long and having its outer surface tapered somewhat from a larger diameter at its center to a smaller diameter at its ends in order to reduce reflection of high frequency electrical energy from its ends, means for variably positioning said mass along said line to vary the effective length of said line for such energy, means indicating the position of said mass along said line and calibrated to indicate the frequency corresponding to such effective length for such position, means for connection of such energy to such line, and means for indicating the amplitude of the electrical energy in said line.

JOHN L. BARKER.

References Cited in the file of this patent

UNITED STATES PATENTS

| Number | Name | Date |
|---|---|---|
| 2,106,713 | Bowen | Feb. 1, 1938 |
| 2,157,855 | Koch | May 9, 1939 |
| 2,226,479 | Pupp | Dec. 24, 1940 |
| 2,245,138 | Zottu | June 10, 1941 |
| 2,419,208 | Frantz et al. | Apr. 22, 1947 |
| 2,421,784 | Haeseler | June 10, 1947 |
| 2,444,041 | Harrison | June 28, 1948 |
| 2,449,182 | Sontheimer | Sept. 14, 1948 |
| 2,454,530 | Tiley | Nov. 23, 1948 |
| 2,463,417 | Overacker | Mar. 1, 1949 |
| 2,467,104 | White | Apr. 12, 1949 |
| 2,503,256 | Ginzton | Apr. 11, 1950 |
| 2,551,398 | Sensiper | May 1, 1951 |
| 2,571,676 | Bull | Oct. 16, 1951 |